(Model.)
H. EITENMÜLLER.
Bee Hive.
No. 241,638. Patented May 17, 1881.
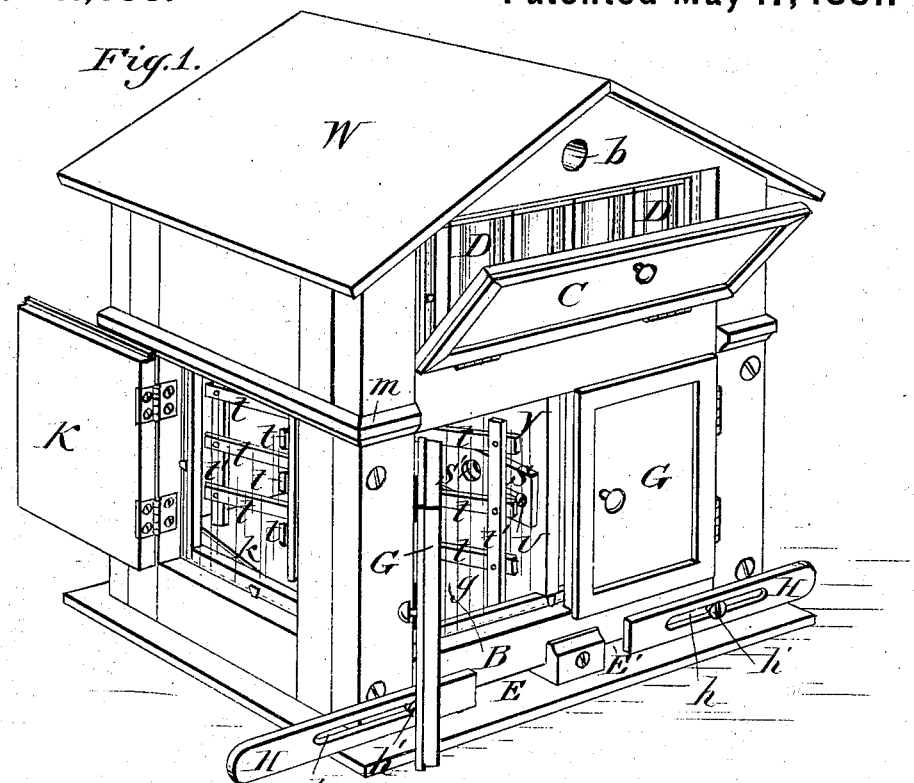
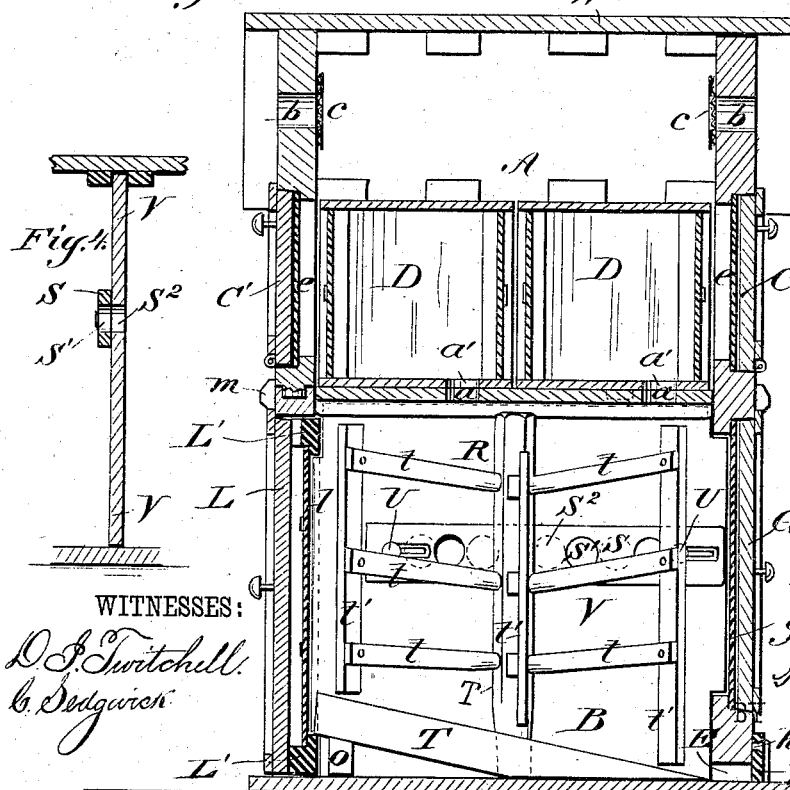
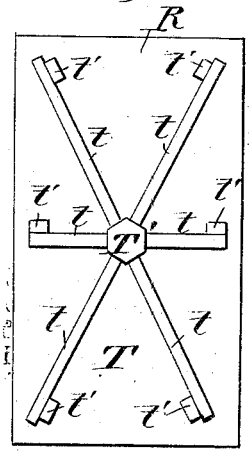
WITNESSES:
D. J. Twitchell
C. Sedgwick
INVENTOR:
H. Eitenmüller
ATTORNEYS.

UNITED STATES PATENT OFFICE.

HENRY EITENMÜLLER, OF BUTLER, PENNSYLVANIA.

BEE-HIVE.

SPECIFICATION forming part of Letters Patent No. 241,638, dated May 17, 1881.

Application filed March 22, 1881. (Model.)

*To all whom it may concern:*

Be it known that I, HENRY EITENMÜLLER, of Butler, in the county of Butler and State of Pennsylvania, have invented new and useful Improvements in Bee-Hives, of which the following is a specification.

In the accompanying drawings, Figure 1 is a perspective view of my improved bee-hive. Fig. 2 is a transverse sectional elevation of the hive from front to back. Fig. 3 is a plan view of improved honey-comb rack removed from the brood-chamber. Fig. 4 is a vertical cross-section through the central partition which separates the brood-chambers.

Similar letters of reference indicate corresponding parts.

The object of my invention is to construct an improved bee-hive of handsome appearance, which shall afford ready means for the inspection of its interior, to discover and secure the prompt removal of worms or destructive insects, and an easy and convenient removal of the upper comb-boxes and the improved comb-racks in the brood-chambers, means being also provided whereby the honey made in the hive shall be made more secure against marauding bees.

I more particularly describe my invention as follows:

In the construction of my improved bee-hive I have sought to combine an attractive outward appearance with utility, and therefore make it in the form of a small house or cottage with pitched roof, its principal apartments being a lower series of brood-chambers, B, connected by openings $a$ with the upper apartment, A, which contains the removable honey-boxes D, which latter consist of frames of proper material supporting glass sides and ends, and having openings $a'$ through their bottoms corresponding with the openings $a$ through the ceiling of the lower brooding-chambers, B, to permit the bees to pass therefrom into said upper honey-boxes, D.

The gables at front and rear of my hive are provided with ventilating-openings $b$, covered by wire-gauze $c$.

The upper portion of my hive is made so that the roof W, and its back and both sides thereof above the rabbeted molding $m$, may be raised together to permit the removal of the boxes D.

Opaque doors C C' are hinged at the back and front of the upper chamber, A, back of which doors plates of glass or other transparent material, $e$, are secured to the body of the hive. It is evident that an opening of both doors, C C', will permit a sufficient entrance of light to fully examine the transparent honey-boxes D.

The lower portion of the hive is devoted to the brooding-chambers B, which are separated by the partition V. The entrances to said chambers B are at the bottom of the hive in front at E, the openings to the several chambers being covered by my improved slides H, which are slotted at $h$ to permit their passage past the retaining-screws $h'$. The said slots $h$ being above the entrances E, the only admission for the bees is past the inner end of the slides, which may be opened more or less, as required, to prevent the entrance of strange bees which seek to rob the hive.

Opaque doors G close the front ends of the brood-chambers B, back of which doors the transparent plates $g$ are secured to the body of the hive.

The opening of the side opaque doors, K, backed by transparent plates $k$, as also the opening of the opaque back doors, L, backed by the removable frame L', carrying the transparent plate $l$, and the opening of the front doors, G, will permit a close examination of the brood-chambers B from the side or either end of the hive, thus affording proper chance for the discovery of the presence of destructive worms or insects, which may be removed in time to avoid material waste or loss of the contents of the hive.

Upon opening the rear door, L, and removing the glazed frame L' the comb-racks may be withdrawn from the brood-chambers B, when deemed proper, it frequently happening that young bees that have been hived late in the season do not accumulate a sufficient quantity of material on the comb-racks in the brood-chambers of hives to keep them over the winter; and whenever this occurs one of my improved racks can be quickly and easily removed and another one substituted which contains more material on which the young bees may thrive. These removable comb-racks R are an important feature of my invention, their superior strength and portability rendering them especially desirable. Their base T is beveled to an edge toward the front entrance to the hive, and its back end is elevated on the cleat o, which permits the escape down the incline and through the opening E of the waste matters from the hive. Said base T loosely fits the rectangular brood-chamber in which it is held, and in its center the strong upright post T' is fitted, in which post T' the radiating arms $t$ are firmly secured, said arms $t$ being connected at their outer ends by the upright bars $t'$.

It is obvious that this construction of comb-rack combines great portability with a substantial support for the honey-comb formations, which admits of a quick exchange of racks to accommodate the young bees, as aforesaid, and also insures the stability and safety of the comb structure until its completion, avoiding the loss attending the crushing of the comb structure by its own weight or upon its removal when not built upon racks affording proper security.

Upon leaving one of the front slides, H, open the rack in the brood-chamber thus made accessible is first filled by the bees. My improved slide S, which has perforations S', which alternate with the perforations $S^2$ in the partition V, separating the brood-chambers, and which is shown closed in Fig. 2, may then be moved horizontally on the headed pins $v$, so as to open communication between the filled brood-chamber and the adjoining brood-chamber. The front slide H formerly open may now be closed, and the other slide H, which affords entrance to the chamber in which the empty comb-rack rests, is then opened. The bees in the filled brood-chamber, unable to pass out at the front at E, will pass into the empty chamber, when the slide S may again be closed and the bees be compelled to fill the rack in second brood-chamber; and upon opening the back doors, L, and removing the glazed frame L', the filled rack R in the first brood-chamber may be easily removed and an empty one substituted therefor at pleasure.

The quantity of honey and comb deposited in the upper boxes, D, may also be regulated by the operation of the slides S and H, as aforesaid.

The construction of my improved hive is such that it affords ample shelter to the bees within in any weather without additional covering, and it is in every way adapted to secure the best possible financial results from bee-culture.

Having thus fully described my invention, I claim as new and desire to secure by Letters Patent—

1. In combination with contiguous brood-chambers B of a bee-hive, the slides S and H H, substantially as and for the purposes herein specified.

2. The honey-comb racks R, constructed with an inclined base, T, loosely fitting the interior of the brood-chambers B of a bee-hive, and carrying the central supporting-post, T', the radial arms $t$, and uprights $t'$, all substantially as and for the purposes herein set forth.

HENRY EITENMÜLLER.

Witnesses:
  J. F. PEFFER,
  E. I. BRUGH.